INVENTOR
Tomoji Murata
Atsuyuki Tanaka
BY Watson, Cole, Grindle & Watson
ATTORNEY

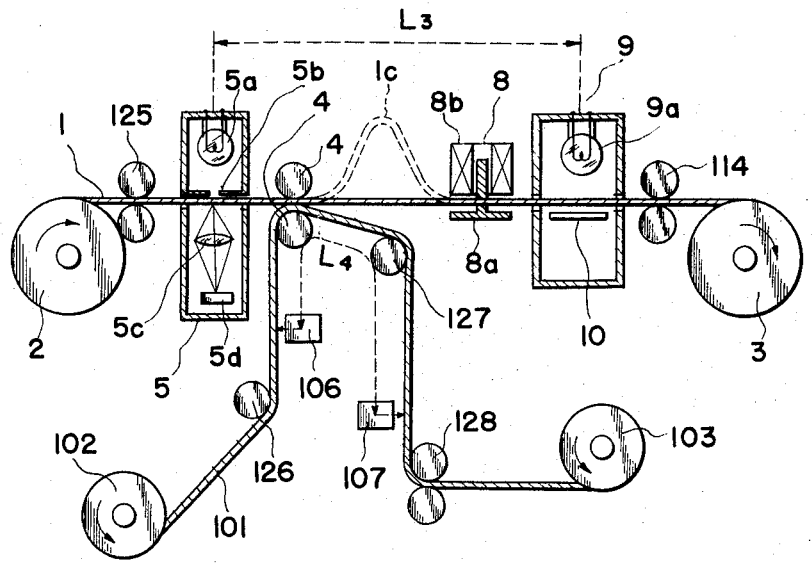

United States Patent Office 3,671,123
Patented June 20, 1972

3,671,123
DEVICE FOR INSURING REGISTRATION OF THE PICTURE FRAME WITH THE PRINTING STATION IN MAKING PRINTS FROM A FILM
Tomoji Murata, Sakai-shi, Osaka-fu, and Atsuyuki Tanaka, Toyonaka-shi, Osaka-fu, Japan, assignors to Minolta Camera Kabushiki Kaisha, Osaka, Japan
Filed May 22, 1970, Ser. No. 39,827
Int. Cl. G03b 27/04
U.S. Cl. 355—97                             9 Claims

ABSTRACT OF THE DISCLOSURE

A printing apparatus for sequential printing of pictures from images appearing in a plurality of frames disposed in sequence on a film not provided with perforations, including a first detecting means for detecting the passing of a front edge of a picture frame of the film transported by a transport means, and a second detecting means, actuated when said first detecting means detects the front edge of a certain picture frame to operate a film stop means and an exposure means when a film travel distance corresponding to the distance between the first detecting means and said exposure means is detected.

BACKGROUND OF THE INVENTION

The present invention relates to a printing apparatus and more particularly to a printing apparatus which transports a plurality of picture frames disposed on one long film, not provided with perforations, correctly in turn to an exposure means and stops them there to print pictures formed on said picture frames.

In the case of a film not provided with perforations, the intervals between picture frames are not uniform as compared with those of a film provided with perforations such as a 35 mm. film. Therefore, when a plurality of pictures disposed on a film not provided with perforations are printed, by transporting the film always by a certain distance, it is impossible to have each picture frame coincide exactly with the correct exposure position. Thus extra effort is required to ensure that each picture frame coincides correctly with the exposure position.

SUMMARY OF THE INVENTION

In order to remove the drawback in printing a plurality of pictures disposed on a film not provided with perforations as described above, in the present invention when a first detecting means, disposed facing a film transported by a transport means, detects the passing, over the detecting point, of a front edge of a picture frame, a second detecting means is actuated, and said second detecting means detects a film travel distance corresponding to the distance between said first detecting point and a point in an exposure means where the front edge of said picture frame is correctly located, and operates a film stop means to stop the film at the correct exposure position and at the same time actuates said exposure means to print the picture.

The primary object of the present invention is to provide a printing apparatus which detects automatically the picture frame intervals of a film having a plurality of picture frames of which the intervals between picture images are not uniform, and automatically positions the picture frames in the correct printing position.

The second object of the present invention is to provide a printing apparatus in which a film is transported lengthwise by means of a film transport means, and including a first detecting means for detecting a front edge of a picture frame and actuating a second detecting means for detecting a film travel distance corresponding to the distance between the detecting point of said first detecting means and an exposure position, said second detecting means operating a film stop means for stopping the picture frame at the exposure position.

The third object of the present invention is to provide a printing apparatus in which a marking member operated by the first detecting means for detecting a front edge of a picture frame marks a signal on the film, and when said mark travels as far as the interval between said edge detecting means and an exposure device, said second detecting means detects said signal to operate a film stop means.

The fourth object of the present invention is to provide a printing apparatus in which a marking means operated by an edge detecting means for the picture frame records a signal on a tape carried in synchronism with a film and said signal travels as far as the interval between said edge detecting means for the picture frame and an exposure means, said the second detecting means detecting said signal to operate a film stop means.

The fifth object of the present invention is to provide a printing device in which the second detecting means, operated by an edge detecting means for the picture frame, is provided with a member interlocked with the film transport means, and by way of said means said second detecting means operates an intermittent film stopper by measuring out the length along which the film is transported as far as the interval length between said edge detecting means and an exposure device.

The sixth object of the present invention is to provide a printing apparatus so formed that while a film stopper is in operation, a film transported continuously by a film transport means forms a loop on the approach side of said film stopper, and the film formed with said loop is transported quickly by a film delivery and tension means, as soon as the operation of said film stopper is released, and brings the next picture frame quickly to an exposure means.

BRIEF DESCRIPTION OF THE DRAWINGS

FIG. 4 is a side view in partial section showing the second embodiment in accordance with the present invention.

FIG. 5 is a side view showing the third embodiment in accordance with the present invention.

DESCRIPTION OF THE PREFERRED EMBODIMENT

Figure 1:
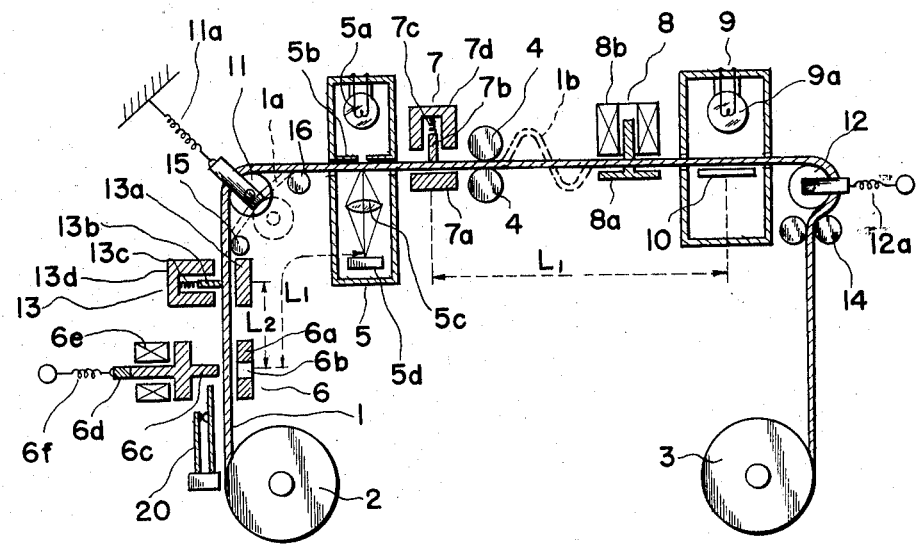
FIG. 1 is a side view in partial section showing the general formation of the first embodiment in accordance with the present invention.

The first embodiment in accordance with the present invention is illustrated with reference to FIGS. 1, 2, and 3, wherein reference numeral 1 denotes a film having a plurality of negative pictures in succession, which is wound over from feed reel 2 to take up reel 3 so as to be carried along a film carrying path by means of driving rollers 4 rotating continuously.

Reference numeral 5 denotes a detecting means for detecting the front edge of a picture frame, and arranged nearer to the feed reel side than said driving rollers 4 on said film carrying path, and slit 5b at right angles with the film carrying direction, and light source 5a for illuminating said slit 5b are placed on the upper or back side of film 1, and on the lower side of said film 1 there is provided a lens 5c for focussing a film image on the light receiving face of a photoelectric conversion element 5d such as CdS.

Thus, when the film travels along its path, at the front edge, for example, of the first picture frame disposed on film 1, the change of the brightness in the picture frame is detected as a change of the output current of said photoelectric conversion element.

On the film path at a certain distance $L_1$ from said edge detecting means 5 toward the feed reel 2, there is placed perforator 6 for perforating either edge of said film 1, as a marking member, and punch table 6a is provided on one side of film 1 and on the other side of film 1a protrusion 6c, for fitting in hole 6b on said punch table 6a, is provided. Said protrusion 6c is normally held in the retracted position relative to the film by means of tension spring 6f connected to the main body of that printing apparatus and is moved to perforate said film 1 by means of armature 6d, fixed to the tail end of said protrusion 6c, and electromagnetic coil 6e surrounding said armature 6d, when said electromagnetic coil 6e is actuated with the exciting current.

When said photo-electric conversion element 5d in edge detecting means 5 detects the front edge of a picture frame on transported film 1, release switch 18 (FIG. 2) is closed and its detecting current is input to switching circuit 17 such as a single ballast multivibrator to introduce an exciting current for actuating electromagnetic coil 6e connected to its output circuit.

Reference numeral 11 in FIG. 1, denotes a tension roller provided with spring 11a connected to the main body, which permits stopping the film driven by driving rollers 4 while said protuberance 6c is in perforating operation for said film 1. Reference numerals 15, 16 denote idler rollers for curving film 1 as shown by broken lines 1a.

Between said edge detecting means 5 for the picture frame and the driving rollers 4, mark detecting means 7 is placed to detect holes formed in said film 1, and receiving table 7a is provided on one side of film 1 and on the other side of said film 1 there is provided pin 7b for fitting in the hole provided on holding body 7d and urged by spring 7c so as to form an electric switch through said receiving table 7a and pin 7b. That is, said switch 7a, 7b is opened ordinarily through interposition of film 1, however, when a hole in said film 1 arrives thereat, said receiving table 7a and pin 7b come into contact with each other so as to close the switch.

On the film carrying path at a distance $L_1$ from said detecting device 7 toward the take-up reel side, exposure means 9 is placed. That is, in the advancing direction of film 1, the interval between perforator device 6 and edge detecting means 5 is quite equal to that between detecting means 7 and exposure means 9.

Said exposure means 9 is provided with light source 9a and printing paper 10 so as to expose the picture of the picture frame on film 1 stopped by film stop means 8, described later, to printing paper 10, and in the case of a contact print film 1 and printing paper 10 are put in close contact and in the case of enlarging, a projection lens not shown in the drawings is provided between them.

Film stop device 8, placed just before the film feed side of said exposure means 9, is composed of electromagnetic coil 8b and brake block 8a provided with an armature inserted in said coil 8b, and when said coil 8b is excited, said brake block 8a is attracted and thereby both side edges of film 1 are nipped by said coil 8b and brake block 8a so as to stop said film 1 between said stop means 8 and take-up reel 3.

While film stop means 8 is in operation, therefore, the film transported by rollers 4 is slackened as shown by broken lines 1b. On the other side, reference numeral 12 denotes a tension roller provided with spring 12a, and in the case mentioned above, through the take-up operation of take-up reel 3 said tension roller 12 moves forward, to the left in FIG. 1, against the tension of spring 12a, and when the operation of the film stop means 8 is released spring 12a contracts and tension roller 12 moves to the right to tension quickly slackened film 1 mentioned above so as to bring about quickly the positioning of the next picture frame of film 1.

Figure 3:
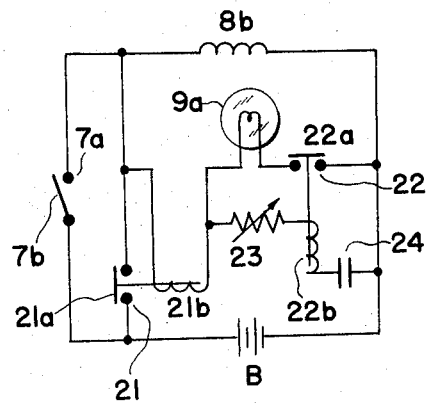
FIG. 3 is a circuit diagram for controlling a film stop means based on a detecting means for detecting a film travel distance and actuating the exposure means in the embodiment shown in FIG. 1.

FIG. 3 shows the circuit for controlling the operation of film stop means 8 effected by closing switch 7a, 7b of detecting means 7 and the lighting of light source 9a in exposure means 9. Said switch 7a, 7b and electromagnetic coil 8b in the film stop motion device form a series circuit relative to power source B, and relay switch 21a for relay 21 for self-holding the closing of said switch 7a, 7b is connected in parallel with said switch 7a, 7b. Relay coil 21b for said relay switch 21a, light source 9a in the exposure device, and relay switch 22a for relay 22 are connected in parallel with said electromagnetic coil 8b, and a circuit of variable resistance 23, relay coil 22b, and condenser 24, connected in series to one another, is connected in parallel with said light source 9a and relay switch 22a.

That is, when said switch 7a, 7b for detecting means 7 is closed, said electromagnetic coil 8b is excited, film stop means 8 stops film 1, and electric current runs through relay coil 21b variable resistance 23, and relay coil 22a to start to charge condenser 24, and accordingly relay 22 operates to light light source 9a to start to expose, and simultaneously operates relay 21 so as to self-hold the electromagnetic coil circuit and the light source circuit, and thus film 1 is transported by driving rollers 4 and it is continued even as switch 7a, 7b is opened.

When charging of condenser 24 is finished, relay 22 becomes inoperative, light source 9a is extenguished, and then relay 21 also becomes inoperative, electromagnetic coil 8b is demagnetized, and the operation of film stop means 8 is finished. Therefore, variable resistance 23 sets up the exposure time.

In accordance with the construction described above, the present invention can be carried out in principle. However, edge detecting means 5 for the picture frame is to detect end edges of the picture frames by scanning the picture images on film 1, so that there is a chance of misoperation depending on light and shade of the picture image itself. That is, in accordance with the light and shade of a picture image itself the current running through photo-electric conversion element 5d is varied and thereby switching circuit 17 is operated and electromagnetic coil 6e can be actuated. In order to remove such a defect, it is desirable that after the front edge of a picture image portion on the picture frame passes over slit 5b of edge detecting means 5 for the picture frame, the output of photoelectric conversion element 5d should not be transmitted to electromagnetic coil 6e in perforate device 6 until said detected picture frame passes completely over slit 5b. Subdetecting device 13 provided between said perforator device 6 and idler roller 15 is to attain said object and the constitution thereof is quite identical with detecting device 7, and the interval $L_2$ between perforator device 6 and device 13 is equal to the length of a picture image on the picture frame.

Figure 2:
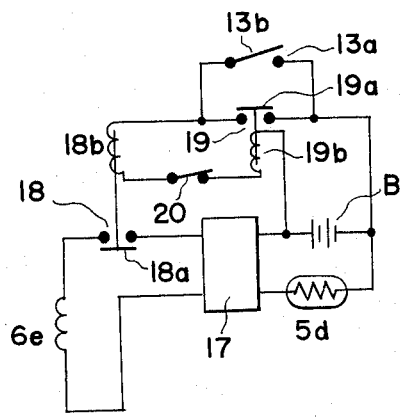
FIG. 2 is a circuit diagram for controlling a marking means in a detecting means for detecting a film travel distance, in accordance with the operation of the edge detecting means for the picture frame in the embodiment shown in FIG. 1.

In FIG. 2, the output of photoelectric conversion element 5d in edge detecting device 5 for the picture frame, connected to power source B, is transmitted as the input to switching circuit 17, and to the output circuit thereof contact 18a of relay 18 and electromagnetic coil 6e in perforator device 6 are connected. To said power source B, switch 13a, 13b composed of pin 13b for subdetecting means 13 and receiving table 13a, and contact 19a of relay 19 for self-holding said switch 13a, 13b are connected in parallel through relay coil 18b for said relay 18, reset switch 20, and coil 19b for relay 19. That is, in FIG. 2, just as edge detecting means 5 for the picture frame detects forward edge of the picture frame, electromagnetic coil 18 is excited, and perforator protrusion 6c shown in FIG. 1 perforates film 1, then through the operation of said perforator protrusion 6c reset switch 20 is opened and the electric current to relay 18 is discontinued, so that relay contact 18a is opened and the picture image in the picture frame passes over photo-electric conversion element 5d, and even though an output electric current results electromagnetic coil 6e does not operate and, accordingly, misperforation is not effected. Just as film 1 travels as far as $L_2$, a picture image in the picture frame of a certain length travels, and the light portion between the picture frames starts to pass slit 5b, then subdetecting means 13 operates and switch 13a, 13b is closed, and then relay coil 18 is excited, relay contact 18b is closed, and simultaneously switch 13a, 13b is self-held by relay 19 and relay contact 18a holds the closing state, so that when the front edge of the next picture frame passes over slit 5b and pulses come out on the output of photo electric conversion element 5d, switching circuit 17 operates to excite electromagnetic coil 6e and operate perforator protrusion 6c. At the same time, reset switch 20 is opened, the self-holding of switch 13a, 13b owing to relay 19, is discontinued and the circuit of electromagnetic coil 6e also is opened.

However, when printing is first started, no perforation is provided and release switches 18 and 19 are opened, so that even though photoelectric conversion element 5d detects the front edge of the first picture frame electromagnetic coil 6e in the circuit shown in FIG. 2 is not operated, and it is impossible to perforate the film. In this case, however, by stopping driving rollers 4 and adjusting the film position manually so as to let the front edge of the first picture frame coincide with slit 5b provided on edge detecting means 5 in FIG. 1, it is possible to operate protrusion 6c manually to form the first perforation. Then, upon starting driving rollers 4 said first perforation comes to subdetecting means 13 to effect the same operation as described above and thus it is possible to print the first picture, and then the automatic operation corresponding to the above description begins.

In this embodiment the perforator device is put to use as a marking member, however, it is possible to equip it to affix an opaque or a magnetic mark as shown in the second embodiment as well.

FIG. 4 shows the second embodiment in accordance with the present invention. In the first embodiment described above, the marking member perforates a film itself to record through detected signals by the edge detecting means for the picture frame, however, in the second embodiment the mark is printed on a recording tape carried at the same speed as the film by the driving rollers 5 and such mark is detected by the detecting means.

In FIG. 4, film 1 is transported from the feed reel 2 to take-up reel 3 by driving rollers 4, 4, and between said driving rollers 4, 4, recording tape 101 is interposed in contact with film 1 and transported from feed reel 102 thereof to take-up reel 103. The recording tape carrying path is formed by idler roller 126, driving rollers 4, and idler rollers 127, 128.

On the other hand, the film carrying path is formed by frictional brake roller 125 provided between feed reel 2 and driving rollers 4, and pulling rollers 114 provided between driving rollers 4 and take-up reel 3 and rotated at a higher speed than said driving rollers 4 through a frictional clutch.

Edge detecting means 5 for the picture frame is placed relative to film 1 tensioned by said frictional brake roller 125 and driving rollers 4 and its constitution is the same as that in the first embodiment. Exposure means 9 is placed just before pulling rollers 114 between driving rollers 4 and said pulling rollers 114, and film stop 8 is placed before said exposure means 9. The constitutions of exposure means 9 and film stop 8 are the same as those in the first embodiment.

Marking member 106 is placed between roller 126 and driving rollers 4 on the recording tape travel path, and detecting means 107 is placed between idler rollers 127 and 128. In said marking member 106 magnetic iron powder is adhered to the recording tape so as to be detected by a magnetic head in detecting means 107, however, the marking can be effected by the perforator device as shown in the first embodiment, or it is also possible to provide means to print black marks and detect them.

Provided that the interval between slit 5b in edge detecting means 5 and the center of exposure means 9 on said film carrying patch is $L_3$ and the interval between marking member 106 and detecting device 107 on said recording tape carrying path is $L_4$, the following formula is set up:

$$L_3 + \frac{W}{2} = L_4$$

(wherein, W is the length of a picture frame and a constant).

For the circuits of edge detecting means 5 for the picture frame and marking member in the second embodiment there is not provided a subdetecting means and accordingly there is no relay circuit based on the subdetecting means shown in FIG. 2, and the electromagnetic coil for marking member 106, the self-holding relay thereof, and the reset switch are connected in series to the output circuit of switching circuit 17. Also in the second embodiment, however, it is possible to provide a subdetecting means so as to make an equivalent to the control circuit shown in FIG. 2.

And, the control circuit for film stop 8 based on detecting means 107 is quite the same as that in FIG. 3 except that said magnetic head is connected thereto instead of switch 7a, 7b in FIG. 3.

Besides, the fact that the film is slackened between driving rollers 4 and film stop 8 on account of the operation of said film stop 8 is the same as in the first embodiment, and when the operation of film stop 8 is released, pulling rollers 114 send said slackened film quickly to take-up reel 3 and carry the next picture frame quickly to exposure means 9, and accordingly increase the reprinting efficiency.

In the third embodiment shown in FIG. 5 in accordance with the present invention, the second detecting means is composed of a pulse oscillating means synchronized with travel of the film, a counter circuit for said pulse, and a starting circuit for said pulse counter.

That is, on the film path between feed reel 2 and take-up reel 3 there are placed in order edge detecting means 5 for the picture frame, driving rollers 4, film stop 8, and exposure means 9. Said driving rollers 4 are driven by driving roller 231 driven by rotary shaft 230 of prime mover M through transmission mechanisms 232, 233, and said driving roller 231 is interlocked with pulse oscillating roller 206. Said pulse oscillating roller 206 has notch 206a on its periphery and is provided with switch 207 composed of movable contact piece 207a for engaging with said notch 206a and fixed contact piece 207b thereto, so as to oscillate pulses in synchronism with rotation of driving rollers 4.

Figure 6:
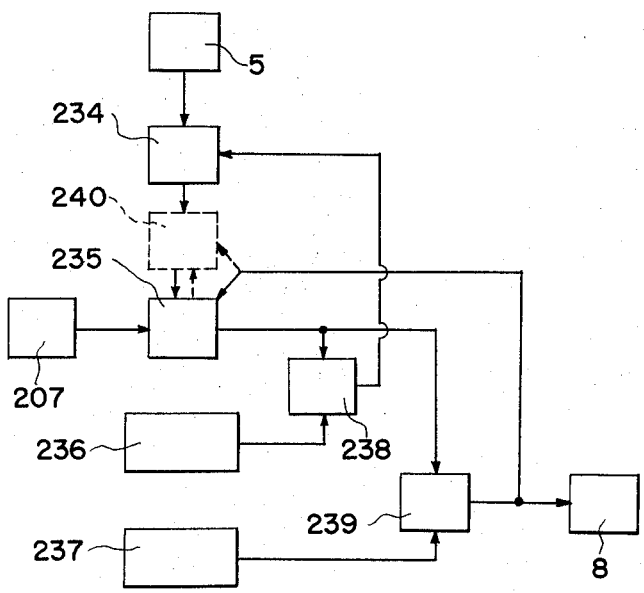
FIG. 6 is a block diagram of a control circuit in the third embodiment shown in FIG. 5.

FIG. 6 is a block diagram of the counter circuit. A first signal from the edge detecting means 5 comes into counter circuits 235 through opened gate 234. On the film path, between edge detecting means 5 and exposure means 9, pictures for several frames are usually disposed, so that counter circuits corresponding to the number of said frames are provided, and the first counter circuit is started by an allotter for said counter circuits, and just as the first signal passes through, gate 234 is closed.

Pulse signals from pulse oscillating means 207 have been transmitted to counter circuits 235, so that said first counter circuit started starts to count the pulse number.

Block 236 shows a pulse set-up means for setting up a pulse number corresponding to the length of a picture, and comparison circuit 238 generates an output when the set-up pulse number of pulse set-up means 236 coincides with the pulse number counted by counter circuits 235 and said output is transmitted to gate 234 to open said closed gate.

Therefore, when a second signal comes from edge detecting means 5, it comes into counter circuits 235 through gate 234. At this juncture, the allotter for counter circuits 235 starts the second counter circuit. In this case, said first counter circuit remains in the actuated state continuing to count.

In the same manner, a third signal from edge detecting means 5 lets the third counter circuit of counter circuits 235 start to count.

Hereafter, in the course of the same operation continued, the first counter circuit counts the length at which the first picture frame coincides correctly with exposure means 9 after edge detecting means 5 detects the front edge of said first picture frame. At this juncture, comparator 239 detects that the set-up pulse number of information source 237, for setting up a pulse number required for when the film travels as far as said length $$L_5 + \frac{W}{2}$$

has coincided with the pulse number counted by said first counter circuit, and its output is transmitted to film stop 8 to stop the travel of the film at exposure means 9, and, at the same time, its output is transmitted to counter circuits 235 to reset the first counter circuit by means of the allotter.

The first counter circuit reset is to determine that the next signal from the edge detecting means is transmitted through gate 234 by means of the allotter.

Intermediate gate 240 disposed between gate 234 and counter circuits 235, and shown by broken lines, is provided separately from the allotter and counter circuits 235 to transmit signals transmitted from the edge detecting circuit for a picture frame through gate 234 to the first counter circuit of counter circuits 235 to start said first counter circuit and then is closed so as to stop the transmission of said signal to the first counter circuit. After that, said intermediate gate 240 functions so as to transmit the next signal to the second circuit of counter circuits 235 and resets the first counter circuit itself with the signal provided by the first counter circuit, from comparator 239 so as to watch and wait for the next chance, and thereby when a signal from gate 234 comes said intermediate gate 240 is opened so as to transmit said signal to the first counter circuit of counter circuits 235.

In any of the embodiments described above, in the present invention, when printing a roll film having in succession a plurality of picture images in the picture frames, even though intervals between said picture frames are not uniform, the edge detecting means for the picture frame detects the front edge of the picture frame to operate the other detecting means while said film is carried to the exposure means, and said detecting means detects the length along which the picture image in said picture frame is carried to the exposure means and actuates the film stop so as to expose said picture of said picture frame. Therefore, in the present invention, the film is carried in succession to the edge detecting means for the picture frames and the optical detection for its picture frame front edges is facilitated, and in addition printing is effected by stopping the film at the exposure means, so that there is no fear of that movement of a picture image is brought about while being exposed to print, and it is possible to stop a picture image automatically at the proper position on a printing paper.

What is claimed is:

1. An apparatus for printing on a printing material a picture image of a film having picture frames successively disposed thereon, comprising:
a film transport means;
an exposing means for exposing the printing material to a picture on each respective frame;
a stop means for temporarily stopping the film at the position of the exposing means;
a first detecting means for detecting a front edge of each picture frame passing a detecting point;
a second detecting means for detecting the travel of the film by a length corresponding to the distance between said detecting point and the position at which said front edge should be positioned when a printing material is exposed to the frame picture having said front edge, said second detecting means being prepared for said detection in response to said detection for the front edge; and
a means for actuating said stop means and said exposing means in response to the detection of said film travel.

2. An apparatus as set forth in claim 1, wherein
said stop means includes a film clamping member and an electromagnet for actuating said clamping member,
said exposing means includes a lamp for illuminating a frame picture, and in addition:
said exposing means includes an electric circuit for energizing said electromagnet and said lamp.

3. An apparatus as set forth in claim 2, wherein
said film transport means includes a supply spool, a wind-up spool and a film driving member arranged between the spools,
said stop means and said exposing means are arranged between said driving member and said wind-up spool, and
a guide roller is provided between said exposing member and said wind-up spool, said guide roller being tensioned by a spring which can be stretched when said stop means is actuated without stopping said film transport means.

4. An apparatus as set forth in claim 1, wherein said second detecting means includes:
a marking member for putting a mark on the film in response to said detection for the front edge, said marking member being arranged in advance of said detecting point, and
a detector for detecting said mark passing by a point in advance of said exposing means, said point being distant from the exposing means by a distance corresponding to that between said front edge detecting point and said marking position.

5. An apparatus as set forth in claim 4, wherein
said detector includes a switch member being closed in response to said passage of said mark,
said stop means including a film clamping member and an electromagnet for actuating the film clamping member,
said exposing means including a lamp for illuminating a frame picture, and
an electric circuit having a power source to which said electromagnet and said switch member are connected in series with each other, a delay means for controlling the lighting duration of said lamp, and a switch means maintaining its contact by itself during lighting of said lamp, said switch means being connected substantially in parallel with said switch member to said electric power source via said electromagnet.

6. An apparatus as set forth in claim 4, further comprising:
a second detector for detecting said mark passing by a point distant from said marking position by a length corresponding to the length of the picture frame in longitudinal direction, and
a means for interrupting a reactuation of the marking member after an actuation thereof until said second detector detects the mark made by said actuation.

7. An apparatus as set forth in claim 1, wherein said second detecting means comprises:
- a tape which is driven in synchronism with said film transport;
- a marker for putting a mark on the tape when said first detecting means detects a front edge; and
- a detecting member for detecting said mark when it has travelled a distance corresponding to the travel of a front edge of a picture frame from said detecting point to a position in said exposing means at which the front edge should be positioned when a printing material is exposed to the frame picture having edge, said means being responsive to the detecting member.

8. An apparatus as set forth in claim 1, wherein said second detecting means further comprises:
- a pulse generator for generating pulses in relation to said film travel;
- a pulse counter for counting said pulses;
- an information source for generating output corresponding to the number of pulses counted at the pulse counter while said front edge travels from the detecting point to a position at which said front edge should be positioned when a printing material is exposed to the frame picture having the front edge; and
- a comparator for comparing the output of said pulse counter with the output of said information source and generating a signal for actuating said stop means and said exposing means, and resetting said pulse counter when said two outputs coincide with each other, said pulse counter being actuated in response to said detection for the front edge.

9. An apparatus as set forth in claim 8, wherein said pulse counter is provided with a plurality of counter circuits corresponding to the number of picture frames disposed between said first detecting means and said exposing means, and is connected to a gate which is closed by passage of a signal from said first detecting means to said pulse counter,
- a second information source for generating output relating to the number of pulses counted by the pulse counter while a picture frame passes over said detecting point, and
- a second comparator for comparing one of two outputs of counter circuits of said pulse counter with said output of said second information source and generating a signal for opening the gate of the subsequent detecting member when the coincidence of the two outputs is detected.

References Cited

UNITED STATES PATENTS

| | | | |
|---|---|---|---|
| 3,492,071 | 1/1970 | Limnois et al. | 355—83 |
| 2,851,676 | 9/1958 | Woodcock et al. | 340—174 |

SAMUEL S. MATTHEWS, Primary Examiner

R. L. MOSES, Assistant Examiner

U.S. Cl. X.R.

355—102, 112, 132